US 9,002,215 B2

(12) United States Patent
Khatana

(10) Patent No.: US 9,002,215 B2
(45) Date of Patent: Apr. 7, 2015

(54) SPECTRAL ANALYSIS FOR COHERENT OPTICAL RECEIVERS

(71) Applicant: Oclaro, Inc., San Jose, CA (US)

(72) Inventor: Sunil Kumar Singh Khatana, Sunnyvale, CA (US)

(73) Assignee: Oclaro, Inc., San Jose, CA (US)

( * ) Notice: Subject to any disclaimer, the term of this patent is extended or adjusted under 35 U.S.C. 154(b) by 99 days.

(21) Appl. No.: 13/939,492

(22) Filed: Jul. 11, 2013

(65) Prior Publication Data

US 2014/0016927 A1 Jan. 16, 2014

Related U.S. Application Data

(60) Provisional application No. 61/671,436, filed on Jul. 13, 2012.

(51) Int. Cl.
H04B 10/00 (2013.01)
H04B 10/61 (2013.01)

(52) U.S. Cl.
CPC .............. H04B 10/61 (2013.01); H04B 10/615 (2013.01); H04B 10/6165 (2013.01)

(58) Field of Classification Search
USPC .................................................. 398/202–214
See application file for complete search history.

(56) References Cited

U.S. PATENT DOCUMENTS 7,457,538 B2* 11/2008 Strawczynski et al. ......... 398/33
7,715,472 B2* 5/2010 Yu et al. ......................... 375/232
8,340,534 B2* 12/2012 Zhang et al. .................. 398/209
2004/0086275 A1* 5/2004 Lenosky et al. ................. 398/39
2006/0285855 A1* 12/2006 Sun et al. ....................... 398/155
2007/0092260 A1* 4/2007 Bontu et al. ................... 398/152
2008/0152362 A1* 6/2008 Koc ................................ 398/205
2009/0129787 A1* 5/2009 Li et al. .......................... 398/208
2010/0003028 A1* 1/2010 Zhang et al. .................... 398/65
2011/0243561 A1* 10/2011 Li et al. ........................... 398/65
2011/0274442 A1* 11/2011 Zhang et al. ................... 398/208
2012/0008952 A1* 1/2012 Li et al. ........................... 398/65
2012/0045208 A1* 2/2012 Yasuda et al. ................... 398/65
2012/0087679 A1* 4/2012 Goldfarb ........................ 398/208
2012/0134676 A1* 5/2012 Kikuchi .......................... 398/65
2012/0189318 A1* 7/2012 Mo et al. ........................ 398/152
2014/0016927 A1* 1/2014 Khatana ........................... 398/25

OTHER PUBLICATIONS

Chraplyvy, A.R., "Limitations on Lightwave Communications Imposed by Optical-Fiber Nonlinearities," IEEE Journal of Lightwave Technology, vol. 8, Issue 10, pp. 1548-1557, Oct. 1990.

* cited by examiner

Primary Examiner — Agustin Bello
(74) Attorney, Agent, or Firm — Fenwick & West LLP

(57) ABSTRACT

A coherent optical receiver measures a portion of a spectra of a multi-channel optical signal that includes at least one signal adjacent to a selected signal. The coherent optical receiver determines structure and bandwidth information for the measured portion of spectra, and determines one or more filter parameters for the selected signal based on the structure and bandwidth information of the at least one signal adjacent to the selected signal. The coherent optical receiver adjusts one or more active filter parameters of a carrier phase estimator in the optical coherent receiver to have values corresponding to the determined one or more filter parameters.

20 Claims, 4 Drawing Sheets

400

```
┌─────────────────────────────────────┐
│ Measure a portion of a spectra of a multi-
│ channel optical signal that includes at least
│ one signal adjacent to a selected signal
│ 405
└─────────────────────────────────────┘
                  │
                  ▼
┌─────────────────────────────────────┐
│ Determine signal information from the
│ measured portion of spectra
│ 410
└─────────────────────────────────────┘
                  │
                  ▼
┌─────────────────────────────────────┐
│ Determine one or more filter parameters for
│ the selected signal based on signal
│ information for at least one signal adjacent to
│ the selected signal
│ 415
└─────────────────────────────────────┘
                  │
                  ▼
┌─────────────────────────────────────┐
│ Adjust one or more active filter parameters for
│ carrier phase estimation based on the
│ determined filter parameters
│ 420
└─────────────────────────────────────┘
```

Fig. 4

SPECTRAL ANALYSIS FOR COHERENT OPTICAL RECEIVERS

BACKGROUND CROSS-REFERENCE TO RELATED APPLICATION(S)

This application claims priority under 35 U.S.C. §119(e) to U.S. Provisional Patent Application Ser. No. 61/671,436, titled "Spectral Analysis for Coherent Optical Data Receivers," filed on Jul. 13, 2012. The subject matter of the foregoing is incorporated herein by reference in its entirety.

BACKGROUND

1. Field of Disclosure

This disclosure relates to the field of coherent optical receivers.

2. Description of the Related Art

Modern fiber-optic communications systems use coherent optical data receivers that operate at 10, 40 or 100 gigabits per second. At such high data rates small deviations from ideal, linear system behavior can have a significant effect on receiver performance. The presence in an optical fiber of a data signal at one wavelength can affect other data signals at other wavelengths, as described in, for example, "Limitations on Lightwave Communications Imposed by Optical-Fiber Nonlinearities" by Andrew R. Chraplyvy (IEEE Journal of Lightwave Technology, 8, 1548-1557, 1990).

The spectrum of optical signals at the input to a coherent optical data receiver may not be known or may change as various data channels turn on and off. Thus, building a receiver that has optimum performance in the face of changing spectral conditions is a challenging problem.

SUMMARY

In one embodiment, a coherent optical receiver measures a portion of a spectra of a multi-channel optical signal that includes at least one signal adjacent to a selected signal. The coherent optical receiver determines structure and bandwidth information for the measured portion of spectra, and determines one or more filter parameters for the selected signal based on the structure and bandwidth information of the at least one signal adjacent to the selected signal. The coherent optical receiver adjusts one or more active filter parameters of a carrier phase estimator in the optical coherent receiver to have values corresponding to the determined one or more filter parameters.

In another embodiment, instructions are provided to an optical front end of an optical coherent receiver to measure a portion of a spectra of a multi-channel optical signal that includes at least one signal adjacent to a selected signal. Structure and bandwidth information is received for the measured portion of spectra from a digital signal processing (DSP) modem of the optical coherent receiver, and one or more filter parameters are determined for the selected signal based on the structure and bandwidth information of the at least one signal adjacent to the selected signal. Instructions are provided to the DSP modem to cause a carrier phase estimator to adjust one or more active filter parameters values to match the values of the determined one or more filter parameters.

In yet another embodiment, a non-transitory computer-readable storage medium storing executable computer program instructions for determining one or more filter parameters comprises: providing instructions to an optical front end of an optical coherent receiver to measure a portion of a spectra of a multi-channel optical signal that includes at least one signal adjacent to a selected signal, and receiving structure and bandwidth information for the measured portion of spectra from a digital signal processing (DSP) modem of the optical coherent receiver. One or more filter parameters are determined for the selected signal based on the structure and bandwidth information of the at least one signal adjacent to the selected signal. Instructions are provided to the DSP modem to cause a carrier phase estimator to adjust one or more active filter parameters values to match the values of the determined one or more filter parameters.

BRIEF DESCRIPTION OF DRAWINGS

FIG. 4 is an example flow chart for a method of optimizing a coherent optical data receiver for processing a selected optical signal that is part of a multi-channel optical signal according to an embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

When the spectrum of optical signals at the input to a coherent optical receiver is measured, the information on adjacent channels that is gained may be used to adjust one or more filter parameters that affect how information is extracted during carrier phase estimation in a coherent optical receiver. In some embodiments, the information on an adjacent channel may be that there is no signal on that channel, thus the absence of an adjacent signal may also be useful to adjust one or more of the filter parameters. Filter parameters include, for example, filter type, tap length, tap weights, that affects a shape of a digital filter used for carrier phase estimation, or some combination thereof. Generally, the number of taps (also referred to as "tap length") corresponds to a number of coefficients that describe the digital filter. The values of the coefficients (also referred to as "tap weights") and the number of taps affect the shape of the digital filter. Accordingly, the response of the digital filter may be modified by varying the filter type, number of taps, one or more tap weights, or some combination thereof. As discussed below, the number of taps used in carrier phase estimation may be adjusted, depending on the presence or absence of cross-phase modulation from data signals adjacent to a desired received signal, to reduce the bit error rate of an output of a coherent optical receiver.

Figure 1A:
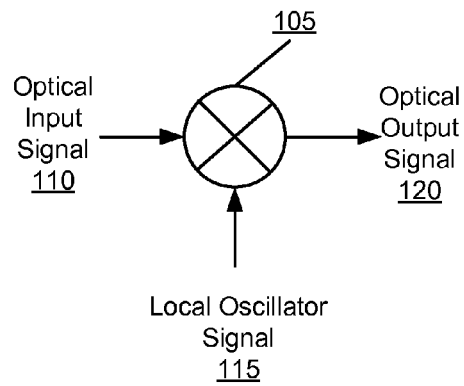
FIG. 1A shows an example optical mixer according to an embodiment.

FIG. 1A shows an example optical mixer 105 according to an embodiment. The optical mixer 105 mixes an optical input signal 110 with a local oscillator signal 115 to produce an optical output signal 120. The mixer 105 or a more complex mixer such as, for example, a six-port optical hybrid is found in the optical front end of a coherent optical receiver. The mixer 105 is configured to translate the carrier frequency of a data signal to baseband.

A local oscillator is a device configured to generate a coherent reference optical field of stable phase (i.e., the local oscillator signal 115) that is mixed with the optical input signal 110 to extract certain information (e.g., phase, amplitude, etc.) from the optical input signal 110. Additionally, when the optical signal contains multiple channels, for example, wavelength division multiplexed (WDM) channel selection may be achieved by tuning the output of the local oscillator close to the desired WDM channel.

Figure 1B:
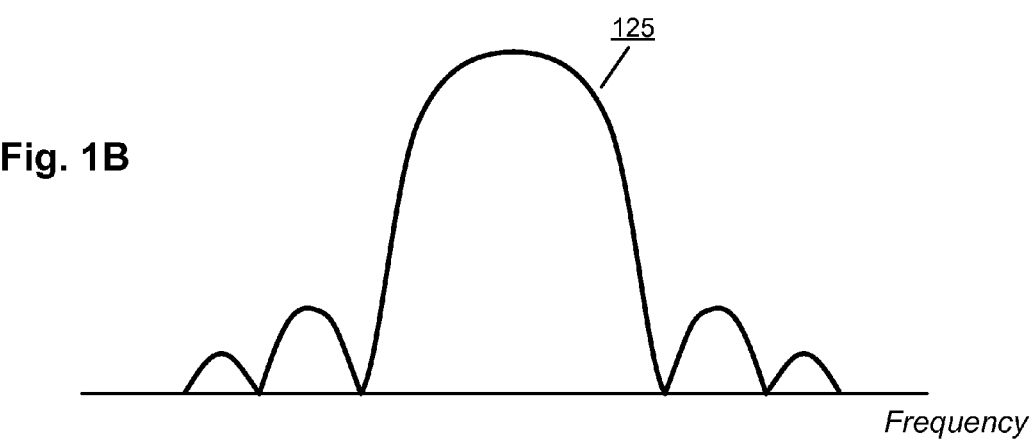
FIG. 1B shows an example frequency spectrum of an optical input signal of FIG. 1A according to an embodiment.

FIG. 1B shows an example frequency spectrum 125 of the optical input signal 110 of FIG. 1A according to an embodiment. The bandwidth and structure of the spectrum reflect the data rate and modulation scheme used.

Figure 1C:
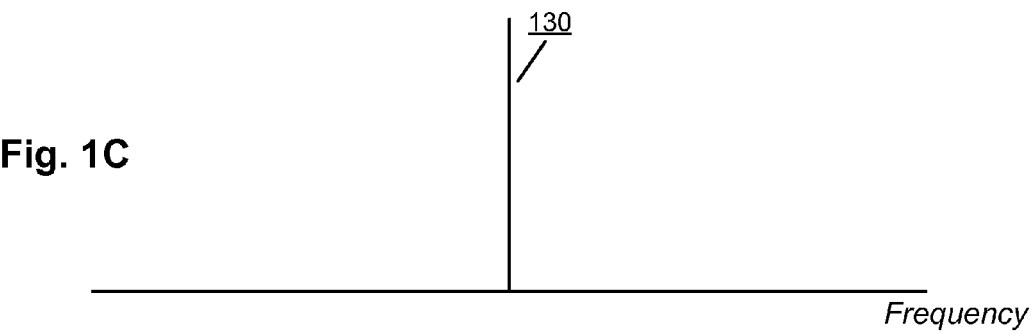
FIG. 1C shows an example frequency spectrum of a local oscillator signal of FIG. 1A according to an embodiment.

FIG. 1C shows an example frequency spectrum 130 of the local oscillator signal 115 of FIG. 1A according to an embodiment. The local oscillator signal 115 is a continuous wave signal having a narrow frequency spectrum. In some embodiments, the frequency of the local oscillator signal 115 may be tuned to different frequency values. For example, in some embodiments, the frequency of the local oscillator signal 115 may be tuned to frequencies in the C-band, L-band, or some other range of frequency values.

Figure 1D:
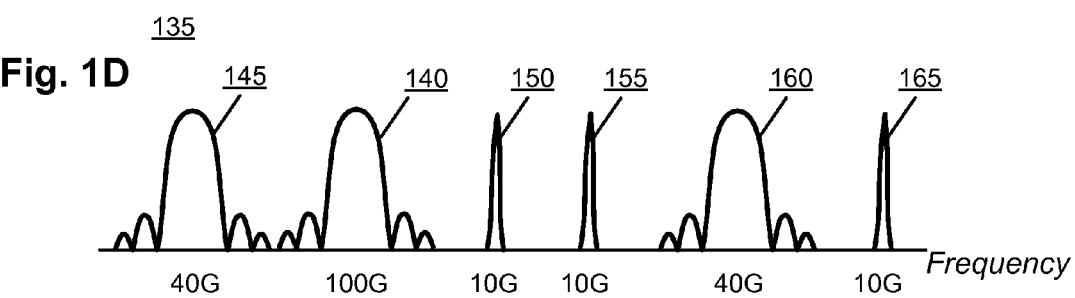
FIG. 1D shows an example multi-channel frequency spectrum of a multi-channel optical signal according to an embodiment.

FIG. 1D shows an example multi-channel frequency spectrum 135 of a multi-channel optical signal according to an embodiment. The multi-channel optical signal may be at the input of a coherent optical receiver. The multi-channel frequency spectrum 135 includes a plurality of frequency spectrums (e.g., 140, 145, 150, 155, 160, and 165) that are each associated with different signals. In some embodiments, the positioning of the frequency spectrums corresponds to particular channels. For example, the spectrum 145 would occupy channel 1, the spectrum 140 would occupy channel 2, etc. And, in some embodiments, the positioning of the channels may map to a particular frequency grid (e.g., ITU-T G.694.1). Of these frequency spectrums, one may correspond to a desired 100 G signal, e.g. the signal associated with the spectrum 140. In some embodiments, the other signals (e.g., adjacent signals that correspond to, for example, spectrums 145 and 150) while carried on the same optical fiber are intended for other receivers. Alternatively, they may be intended for the same receiver which is tuned to receive a desired signal.

If an optical fiber were a perfect, linear transmission medium and a coherent optical receiver were perfectly selective, then the presence of signals adjacent to a desired signal would have no effect on receiver performance. In reality, however, nonlinearities such as cross-phase modulation cause adjacent signals to distort one another. As discussed below, a receiver system ameliorates these nonlinear effects using the spectrum of the desired and adjacent signals.

Figure 2:
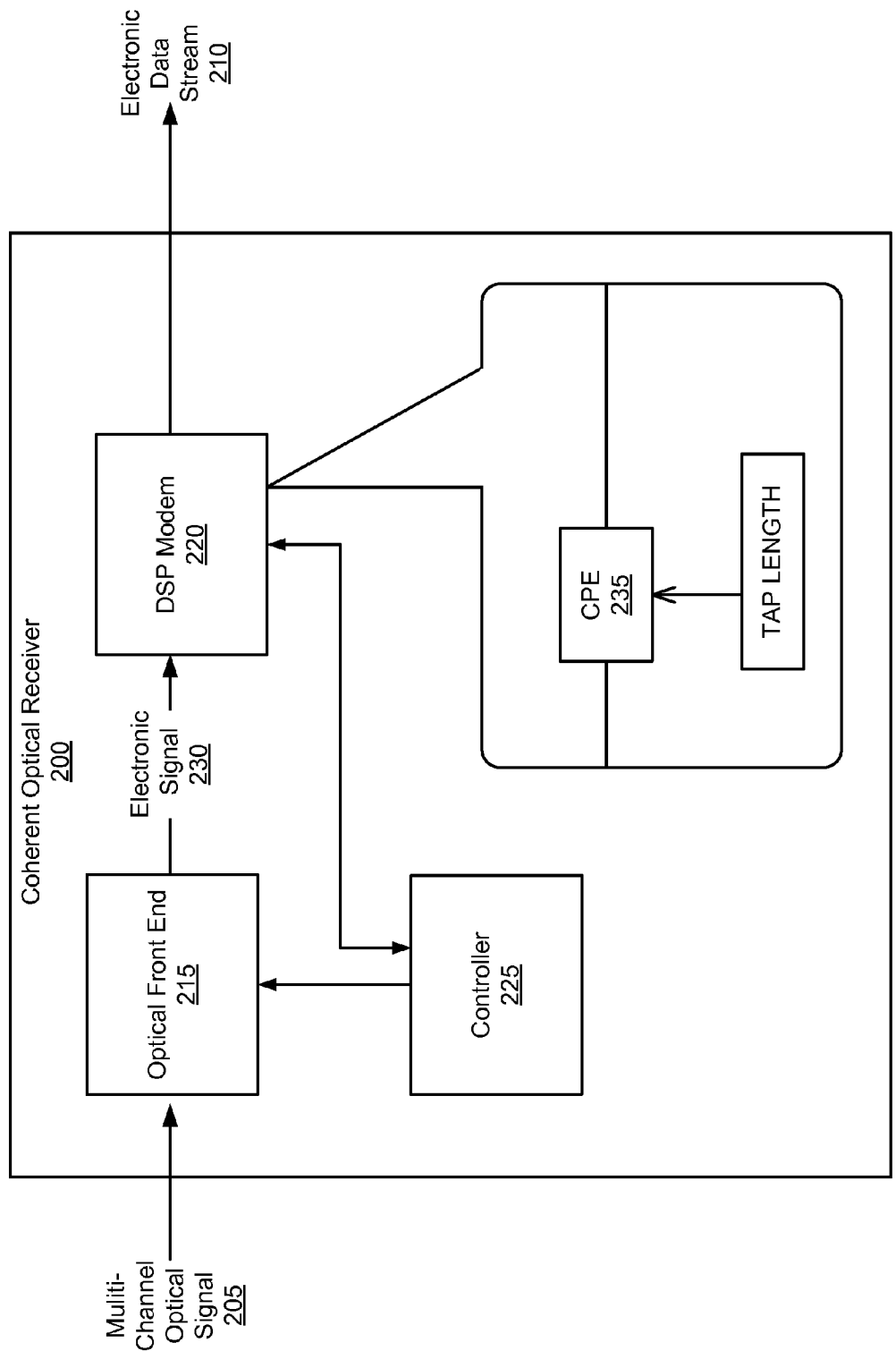
FIG. 2 is a block diagram of an example coherent optical receiver according to an embodiment.

FIG. 2 is a block diagram of an example coherent optical receiver 200 according to an embodiment. The coherent optical receiver 200 is configured to translate a multi-channel optical signal 205 into an electronic data stream 210. The receiver 200 includes an optical front end 215, a digital signal processing (DSP) modem 220, and a controller 225.

The optical front end 215 selects a desired signal of the multi-channel optical signal 205 and converts it to an electronic signal 230. The optical front end 215 may include an optical mixer (e.g., 105), one or more photodetectors (e.g., p-i-n diodes), one or more amplifiers (e.g., trans-impedance amplifiers), one or more polarized beam splitters, a local oscillator, associated sub-systems, or some combination thereof. The optical front end 215 may be configured a variety of ways so long as it selects the desired signal from the multi-channel optical signal 205 and converts the desired signal into the electronic signal 230. In some embodiments, the electronic signal 230 may include multiple electronic signals. For example, the optical front end 215 may be configured to separate the selected signal into orthogonal polarization components (e.g., X/Y polarized waves) and orthogonal phase components (e.g., I/Q channels; I: in-phase component, Q: quadrature component), which are converted into four high-speed differential electrical signals. Beating between the local oscillator signal and the multi-channel optical signal ensures that only the desired optical signal (i.e., signal operating at the same frequency as the local oscillator signal) is amplified. All other signals with frequencies far from the frequency of the local oscillator are attenuated at the electrical amplifiers. Additionally, in some embodiments, one or more filters may be used to remove one or more channels.

The DSP modem 220 processes the electronic signal 230 to output an electronic data stream 210. The DSP modem 220 includes a carrier phase estimator (CPE) 235 and may additionally include one or more modules for analog-to-digital conversion, chromatic dispersion compensation, timing recovery, equalization, slicing, forward error correction, other functions, or some combination thereof. The DSP modem 220 provides signal information derived from the electronic signal 230 to the controller 225. The one or more modules for analog-to-digital conversion sample the electronic signal 230. The DSP modem 220 records the value (e.g., voltage value) of the sampled signal, and uses the recorded values to create the signal information. Signal information may include structure information, bandwidth information, signal amplitude, relative channel power, some other information relevant to characterizing the signal being processed, or some combination thereof. Structure information refers to how the signal was modulated (e.g., QPSK). Bandwidth information refers to the amount of bandwidth the signal being processed occupies. For example, the bandwidth may be 10 GHz, 100 GHz, etc.

The CPE 235 estimates an average phase of a carrier of the selected signal by averaging the phase over many symbol intervals in the electronic signal 230 using a digital filter. The phase of each symbol in an non-return to zero (NRZ) symbol stream is determined by comparison to the calculated average phase. The amount of averaging that takes place is determined by the number of carrier phase estimator taps (taps).

Responsive to instructions from the controller 225, the CPE 235 is configured to adjust one or more filter parameters of the digital filter. Additionally, the CPE 235 may be configured to adjust the number of taps (i.e., the tap length) in accordance with instructions from the controller 225. Additionally, the CPE 235 may be configured to adjust one or more tap weights associated with the digital filter, and/or some other parameter that affects the shape of the digital filter.

In general, if a received signal constellation consists of N symbols equidistant from the origin and equally spaced, then carrier phase estimation may be based on raising the complex number representation of those symbols to the Nth power and dividing the argument of the average by N. The estimation of the carrier phase allows the DSP modem 220 to correct for any phase mismatch between the local oscillator signal and the selected signal.

The controller 225 is configured to execute instructions that control signal selection by the optical front end 215. The controller 225 may instruct the optical front end to select a specific signal from the multi-channel optical signal 205 by adjusting the frequency of the local oscillator signal. Additionally, the controller 225 may instruct the optical front end 215 to sweep the local oscillator signal over a range of frequencies. The range of swept frequencies may include a predetermined frequency range higher than the selected signal, lower than the selected signal, or both. The predetermined frequency range is at least large enough to detect any signals adjacent to the selected signal. A signal adjacent to the selected signal, is a signal that occupies the next channel (below or above) the channel corresponding to the selected signal. Additionally, the predetermined frequency range on either side of the desired signal may be of different sizes ranging from zero to 100's of GHz. For example, the controller 225 may instruct the optical front end 215 to sweep from 200 GHz below the selected signal to 100 GHz above the selected signal. In some embodiments, the range of frequencies may be the full spectral range of the multi-channel optical signal 205.

The controller 225 is configured to execute instructions that determine one or more filter parameters for the selected signal based on the structure and bandwidth information of at least one signal adjacent to the selected signal. In one embodiment, the controller 225 retrieves signal information (e.g., structure and bandwidth information) from the DSP modem 220 over a range of frequencies that include the selected signal and at least one adjacent signal. The controller 225 may include a lookup table that maps signal information to one or more filter parameters. The controller 225 retrieves from the lookup table one or more filter parameters that correspond to the received signal information. The controller 225 provides the retrieved information to the DSP modem 220.

In general, the optimum number of taps (i.e. averaging time) and the optimum shape of the averaging filter depend on nonlinear effects in an optical channel. Longer averaging suppresses noise, but too-long averaging is detrimental in the presence of nonlinearities such as cross phase modulation (XPM). XPM can results in inter-channel cross talk between signal in the multi-channel optical signal, and may also produce amplitude and or timing jitter. Adjacent optical data channels are affected by XPM and the effects of XPM change as channels are added or dropped. For example, if nearby channels cease transmission, then the number of taps should be increased to take advantage of additional averaging. On the other hand, if nearby channels begin transmission after a period of inactivity, then the number of taps should be adjusted to achieve better performance. In particular the optimal number of taps is fewer when XPM is likely than when it is not. The controller 225 is able to estimate a likelihood that XPM occurs using data stored in the lookup table.

In some embodiments, the signal information and corresponding one or more filter parameters are determined during a system modeling process and are subsequently uploaded into the lookup table. During the system modeling process performance is measured (e.g., BER) for different configurations of signal information and filter parameters. Optimal values for one or more of the filter parameters may then be determined based on different configurations of signal information. This mapping between possible signal information and optimal filter parameters is stored in the lookup table. In some embodiments, structure information may be used to determine a particular filter type. For example, structure information indicating QPSK of the adjacent signals, may call for XXX filter type. This structure information and corresponding filter type is included in the lookup table. Additionally, in some embodiments, the controller 225 may periodically update the information in the lookup table (e.g., automatically request updates from a central server.). In FIG. 2, the controller 225 is separate from the DSP modem 220. In alternate embodiments, the controller 225 may be part of the DSP modem 220.

Figure 3:
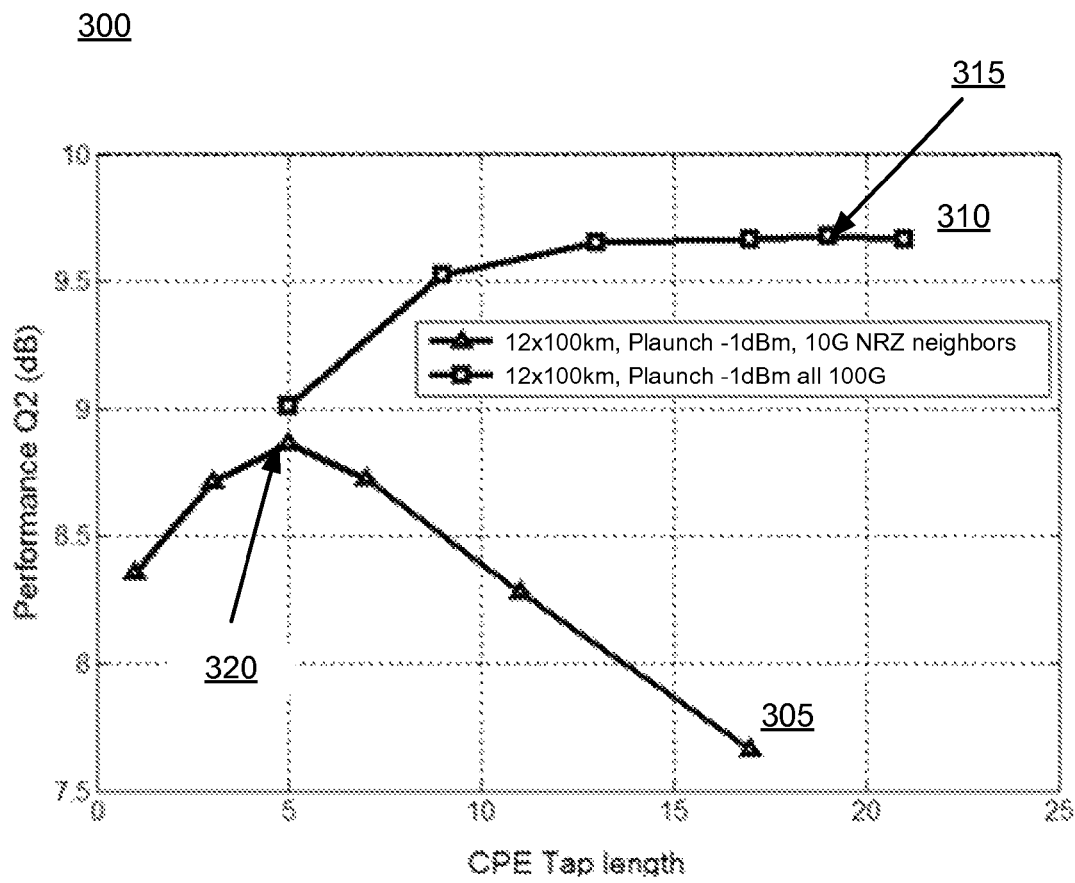
FIG. 3 shows an example graph comparing the performance of a selected signal under different conditions according to an embodiment.

FIG. 3 shows an example graph 300 comparing the performance of a selected signal under different conditions according to an embodiment. In FIG. 3, the performance (Q value) correlates with a bit-error-rate of the electronic data stream 210, specifically, as the performance increases, the bit-error-rate drops. The horizontal axis refers to the tap length (i.e., the number of taps). The graph 300 includes a curve 305 and a curve 310. Both curves 305, 310 represent cases where 1 dB of optical input power is launched into a fiber (1 dBm Plaunch) that has 12 lengths, and each length is a 100 km long. Curve 310 is representative of how signal performance varies with tap length when the adjacent signals are 10 G NRZ. In contrast, curve 305 is representative of how signal performance varies with tap length when the adjacent signals are 100 G NRZ. Curve 310 appear to have an optimal tap length 315 of 19 taps, and curve 305 appears to have an optimal tap length 320 of 5 taps.

FIG. 4 is an example process 400 for optimizing a coherent optical receiver 200 for processing a selected optical signal that is part of a multi-channel optical signal 205 according to an embodiment. The coherent optical receiver 200 measures 405 a portion of the spectra of the multi-channel optical signal 205 that includes at least one signal adjacent to a selected signal. The portion measured may be some or all of the spectra of the multi-channel optical signal. For example, the coherent optical receiver 200 may sweep the LO frequency over a range of frequencies that include at least one signal that is adjacent to the selected signal.

The coherent optical receiver 200 determines 410 signal information from the measured portion of spectra. For example, the coherent optical receiver 200 may use power readings from an analog-to-digital converter over the measured portion of the spectrum to determine the signal information. Bandwidth information may be determined by identifying the measuring the width of the 3 dB points for one or more signals in the measured portion of the spectrum. Structure information may be determined by the shape (e.g., roll off the spectrum) of one or more signals in the measured portion of the spectrum. Additionally, in some embodiments, relative channel power may be estimated by looking at the relative levels of power between one or more of the signals in the measured portion of the spectrum.

The coherent optical receiver 200 determines 415 one or more filter parameters for the selected signal based on signal information for at least one signal adjacent to the selected signal. For example, the coherent optical receiver 200 may reference a lookup table to determine a filter type, tap length, one or more tap weights, or some combination thereof, for the selected signal using the signal information of at least one adjacent signal.

The coherent optical receiver 200 adjusts 420 one or more active filter parameters for carrier phase estimation based on the determined filter parameters. For example, the coherent optical receiver 200 may adjust an active filter type to the determined filter type, an active tap length to the determined tap length, one or more active tap weights to the determined one or more tap weights, or some combination thereof. The active filter type is the type of filter the coherent optical receiver 200 is using for carrier phase estimation. The active tap length corresponds to the tap length value that the coherent optical receiver 200 is using for carrier phase estimation. The active tap weight corresponds to the tap weight value that the coherent optical receiver 200 is using for carrier phase estimation.

Additionally, in some embodiments, the coherent optical receiver 200 automatically detects changes in the spectrum of the measured portion of spectra and adjusts the tap length via process 400 accordingly.

Accordingly, the coherent optical receiver 200 is able to adjust one or more filter parameters for a selected signal in a multi-channel signal, based on signal information of at least one adjacent signal, to reduce the bit error rate of the electronic data stream 210. The spectral analysis techniques discussed above improve performance for high-speed coherent optical receivers by optimizing receiver configuration in the presence of nonlinear optical effects from adjacent data channels.

Additional Configuration Considerations

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Additionally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the disclosure, which is set forth in the following claims.

Finally, in the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

The invention claimed is:

1. A method comprising:
   measuring, by an optical coherent receiver, a portion of a spectra of a multi-channel optical signal that includes at least one signal adjacent to a selected signal;
   determining structure and bandwidth information for the measured portion of spectra;
   determining one or more filter parameters for the selected signal based on the structure and bandwidth information of the at least one signal adjacent to the selected signal; and
   adjusting one or more active filter parameters of a carrier phase estimator in the optical coherent receiver to have values corresponding to the determined one or more filter parameters.

2. The method of claim 1, wherein the filter parameters are selected from a group comprising: tap length, one or more tap weights, filter type, or some combination thereof.

3. The method of claim 2, wherein determining one or more filter parameters for the selected signal based on the structure and bandwidth information of the at least one signal adjacent to the selected signal, comprises:
   retrieving from a lookup table a tap length based in part on the structure and bandwidth information for the at least one adjacent signal.

4. The method of claim 2, wherein there is cross phase modulation between the selected signal and at least one adjacent signal, and a determined value for a tap length is less than an active value for the tap length, and adjusting one or more active filter parameters of the carrier phase estimator in the optical coherent receiver to have values corresponding to the determined one or more filter parameters, comprises:
   reducing the tap length.

5. The method of claim 2, wherein at least one of the adjacent signals of the multi-channel signal ceases transmission, and a determined value for a tap length is greater than an active value for the tap length, and adjusting one or more active filter parameters of the carrier phase estimator in the optical coherent receiver to have values corresponding to the determined one or more filter parameters, comprises:
   increasing the tap length.

6. The method of claim 1, wherein measuring, by the optical coherent receiver, a portion of the spectra of a multi-channel optical signal that includes at least one signal adjacent to the selected signal, comprises:
   adjusting a frequency of a local oscillator output such that the frequency sweeps over a range of frequencies.

7. The method of claim 6, wherein the range of frequencies corresponds to the entire spectrum of the multi-channel optical signal.

8. The method of claim 2, further comprising:
   determining that the bandwidth information or structure information of the a portion of the spectra of the multi-channel optical signal spectra has changed;
   measuring, by the optical coherent receiver, the changed portion of the spectra of the multi-channel optical signal;
   determining structure and bandwidth information for the measured changed portion of spectra;
   determining a new tap length for the selected signal based on the newly determined structure and bandwidth information of the at least on signal adjacent to the selected signal; and
   adjusting the active tap length of the carrier phase estimator to the value of the newly determined tap length.

9. A method comprising:
   providing instructions to an optical front end of an optical coherent receiver to measure a portion of a spectra of a multi-channel optical signal that includes at least one signal adjacent to a selected signal;

retrieving structure and bandwidth information for the measured portion of spectra from a digital signal processing (DSP) modem of the optical coherent receiver;

determining one or more filter parameters for the selected signal based on the structure and bandwidth information of the at least one signal adjacent to the selected signal; and providing instructions to the DSP modem to cause a carrier phase estimator to adjust one or more active filter parameters values to match the values of the determined one or more filter parameters.

10. The method of claim 9, wherein the filter parameters are selected from a group comprising: tap length, one or more tap weights, filter type, or some combination thereof.

11. The method of claim 10, wherein determining one or more filter parameters for the selected signal based on the structure and bandwidth information of the at least one signal adjacent to the selected signal, comprises:

retrieving from a lookup table a tap length based in part on the structure and bandwidth information for the at least one adjacent signal.

12. The method of claim 10, wherein there is cross phase modulation between the selected signal and at least one adjacent signal, and a determined value for a tap length is less than an active value for the tap length, and instructing the DSP modem to cause the carrier phase estimator to adjust one or more active filter parameters values to match the values of the determined one or more filter parameters, comprises:

instructing the carrier phase estimator to reduce the tap length.

13. The method of claim 10, wherein at least one of the adjacent signals of the multi-channel signal ceases transmission, and a determined value for a tap length is greater than an active value for the tap length, and instructing the DSP modem to cause the carrier phase estimator to adjust one or more active filter parameters values to match the values of the determined one or more filter parameters, comprises:

instructing the carrier phase estimator to increase the tap length.

14. The method of claim 10, further comprising:

instructing the optical front end and DSP modem to monitor the multi-channel optical signal for changes in its spectra;

responsive to a change in spectra, receiving new structure and bandwidth information for the measured portion of spectra from the DSP modem;

determining a new tap length for the selected signal based on the newly received structure and bandwidth information of the at least one signal adjacent to the selected signal; and instructing the DSP modem to cause the carrier phase estimator to adjust the active tap length to the value of the newly determined tap length.

15. A non-transitory computer-readable medium containing computer-executable instructions for execution by a controller of an optical coherent receiver, the instructions comprising steps for:

providing instructions to an optical front end of an optical coherent receiver to measure a portion of a spectra of a multi-channel optical signal that includes at least one signal adjacent to a selected signal;

retrieving structure and bandwidth information for the measured portion of spectra from a digital signal processing (DSP) modem of the optical coherent receiver;

determining one or more filter parameters for the selected signal based on the structure and bandwidth information of the at least one signal adjacent to the selected signal; and providing instructions to the DSP modem to cause a carrier phase estimator to adjust one or more active filter parameters values to match the values of the determined one or more filter parameters.

16. The computer readable medium of claim 15, wherein the filter parameters are selected from a group comprising: tap length, one or more tap weights, filter type, or some combination thereof.

17. The computer readable medium of claim 16, wherein determining one or more filter parameters for the selected signal based on the structure and bandwidth information of the at least one signal adjacent to the selected signal, comprises:

retrieving from a lookup table a tap length based in part on the structure and bandwidth information for the at least one adjacent signal.

18. The computer readable medium of claim 16, wherein there is cross phase modulation between the selected signal and at least one adjacent signal, and a determined value for a tap length is less than an active value for the tap length, and instructing the DSP modem to cause the carrier phase estimator to adjust one or more active filter parameters values to match the values of the determined one or more filter parameters, comprises:

instructing the carrier phase estimator to reduce the tap length.

19. The computer readable medium of claim 16, wherein at least one of the adjacent signals of the multi-channel signal ceases transmission, and a determined value for a tap length is greater than an active value for the tap length, and instructing the DSP modem to cause the carrier phase estimator to adjust one or more active filter parameters values to match the values of the determined one or more filter parameters, comprises:

instructing the carrier phase estimator to increase the tap length.

20. The computer readable medium of claim 16, further comprising:

instructing the optical front end and DSP modem to monitor the multi-channel optical signal for changes in its spectra;

responsive to a change in spectra, receiving new structure and bandwidth information for the measured portion of spectra from the DSP modem;

determining a new tap length for the selected signal based on the newly received structure and bandwidth information of the at least one signal adjacent to the selected signal; and instructing the DSP modem to cause the carrier phase estimator to adjust the active tap length to the value of the newly determined tap length.

* * * * *